US010393604B2

(12) United States Patent
Pfister et al.

(10) Patent No.: US 10,393,604 B2
(45) Date of Patent: Aug. 27, 2019

(54) METHOD AND A DEVICE FOR DETERMINING THE PROPULSION TORQUE

(71) Applicant: AVL LIST GmbH, Graz (AT)

(72) Inventors: Felix Pfister, Graz (AT); Stefan Jakubek, Vienna (AT)

(73) Assignee: AVL LIST GmbH, Graz (AT)

( * ) Notice: Subject to any disclaimer, the term of this patent is extended or adjusted under 35 U.S.C. 154(b) by 0 days.

(21) Appl. No.: 15/529,888

(22) PCT Filed: Nov. 27, 2015

(86) PCT No.: PCT/EP2015/077896
§ 371 (c)(1),
(2) Date: May 25, 2017

(87) PCT Pub. No.: WO2016/083566
PCT Pub. Date: Jun. 2, 2016

(65) Prior Publication Data
US 2017/0261392 A1    Sep. 14, 2017

(30) Foreign Application Priority Data
Nov. 28, 2014    (AT) .............................. A 50865/2014

(51) Int. Cl.
*G01L 1/00*    (2006.01)
*G01L 5/26*    (2006.01)
(Continued)

(52) U.S. Cl.
CPC .............. *G01L 5/26* (2013.01); *F02D 35/023* (2013.01); *F02D 41/1497* (2013.01); *G01L 3/00* (2013.01);
(Continued)

(58) Field of Classification Search
None
See application file for complete search history.

(56) References Cited

U.S. PATENT DOCUMENTS

2003/0017911 A1    1/2003    Lack
2006/0106526 A1*   5/2006    Sugita ................. G01M 15/044
                                                 701/114

FOREIGN PATENT DOCUMENTS

DE           69809673 T2    4/2003
DE       102007055757 A1    6/2009
(Continued)

OTHER PUBLICATIONS

Translation of International Preliminary Report on Patentability and Written Opinion Application No. PCT/EP2015/077896 dated Jun. 8, 2017 10 pages.
(Continued)

*Primary Examiner* — Aditya S Bhat
(74) *Attorney, Agent, or Firm* — Whitmyer IP Group LLC (57) ABSTRACT

In a test run, in order to easily provide a high-quality propulsion torque of a torque generator based on the partially low-quality measured variables available on the test bench, it is foreseen that an inner torque ($M_i$) of the torque generator (D) is measured and based on the measured inner torque ($M_i$), from an equation of motion, including the measured inner torque ($M_i$), a dynamic torque ($M_{dyn}$) and a shaft torque ($M_w$) measured on the output shaft of the torque generator (D), a correction torque ($\hat{M}_{cor}$) is estimated, and from the estimated correction torque ($\hat{M}_{cor}$) and the measured inner torque ($M_i$), the propulsion torque ($M_v$) according to the relation $M_v = \hat{M}_{cor} + M_i$ is computed.

19 Claims, 2 Drawing Sheets

(51) Int. Cl.
  *G01M 15/08* (2006.01)
  *F02D 41/14* (2006.01)
  *F02D 35/02* (2006.01)
  *G01L 3/00* (2006.01)
  *G01M 15/04* (2006.01)

(52) U.S. Cl.
  CPC .......... *G01M 15/044* (2013.01); *G01M 15/08* (2013.01); *F02D 2200/1004* (2013.01); *F02D 2200/1006* (2013.01)

(56) References Cited

FOREIGN PATENT DOCUMENTS

| | | | |
|---|---|---|---|
| DE | 102010003094 A1 | | 9/2011 |
| EP | 1884756 | * | 9/2005 |
| EP | 1884756 A1 | | 2/2008 |
| WO | 2005083252 A1 | | 9/2005 |

OTHER PUBLICATIONS

Falcone, Paolo et al.: "Non-Linear Net Engine Torque Estimator for Internal Combustion Engine" IFAC Symposium on Advances in Automotive Control Published: Apr. 30, 2004 6 Pages.
English Translation of International Search Report Application No. PCT/EP2015/077896 Completed Date: Feb. 17, 2016; dated Feb. 25, 2016 3 Pages.
German International Search Report and Written Opinion Application No. PCT/EP2015/077896 Completed Date: Feb. 17, 2016; dated Feb. 25, 2016 14 Pages.

* cited by examiner

METHOD AND A DEVICE FOR DETERMINING THE PROPULSION TORQUE

CROSS-REFERENCES TO RELATED APPLICATIONS

The present application is claims priority under 35 U.S.C. 371 to International Application No. PCT/EP2015/077896, filed Nov. 27, 2015, and claims priority from Austrian Patent Application No. A50865/2014, filed on Nov. 28, 2014. All prior applications are herein incorporated by reference.

TECHNICAL FIELD

The present invention refers to a method and a device for determining the propulsion torque of a torque generator, which is mounted on a test bench.

BACKGROUND

On a test bench for motor vehicles, for instance a roller test bench, or for motor vehicle components, such as an engine test bench, a transmission test bench, etc., a test object is subject to a test run and therefore developed or tested with reference to certain questions. To this end, during the test run, by means of suitable measurement sensors, certain measurement variables are detected and, generally in real time, evaluated. A test run is a temporal progression of states of the test object, such as a torque and/or speed, which are set on the test bench by means of actuators or control elements. Moreover, the test object is normally provided at the same time with certain mediums, like water, air, fuel, lubricants, etc., and information, such as control commands, measurement values of mounted sensors, simulated measurement values, etc. The test object is connected to a load machine (often called dyno or dynamometer), which loads the test object according to the test run with a load, such as a positive or negative load torque, or an speed value or a loading condition in general. The test object is operated, according to settings of the test run, against this load or this loading condition.

A test object generally is composed of a combination of a number of real components and a number of virtual components, wherein the real components are mounted as real components on the test bench and the virtual components are provided as simulation models in real time, and are therefore simulated and complement the real components. For example, on a test bench, a real internal combustion engine may be mounted, which is mechanically connected to a dynamometer. The internal combustion engine and the loading machine are controlled according to the test run, for example by adjusting a throttle valve of the internal combustion engine and by setting a setpoint torque or a setpoint speed of the loading machine, which causes a state of the test object and of the load. In order to obtain a realistic test run, or for other reasons, the components of the test object missing on the test bench, such as a gearbox, the drive train, tires, the interaction with the environment of the test object (such as the tire-road contact), etc., are simulated by suitable simulation models ("virtual components"). At the interfaces between these various real and virtual components, various physical variables, such as for example the speeds and torques, may be exchanged. According to the configuration of the test object, therefore, for the various components of the test object, various speeds and torques are required, which have to be provided for the test run.

On a test bench normally torque generators are assumed that generate a torque for driving other components or for changing their status (for instance in order to accelerate them). In a motor vehicle, the torque generator is composed of an internal combustion engine, or for example the electric starter generator. In the area of electric mobility, the torque generator is composed of an electric motor. In the case of hybrid vehicles, the torque generator may also be a combination of an internal combustion engine and an electric motor, wherein the generated torques may be positive, negative or even zero. Such a torque generator generates a torque which is called "inner torque."

In the case of an internal combustion engine, the inner torque is generated, as a thermodynamically induced torque, by the combustion in cylinders. Due to the combustion, periodic torque oscillations are formed, which are typical of internal combustion engines. However, the inner thermodynamically induced torque of an internal combustion engine cannot be directly measured, but is instead estimated from other measurement variables, or may be determined by an indicating measuring technique. An estimation is for instance described in S. Jakubek, et al., "*Schätzung des inneren Drehmoments von Verbrennungsmotoren durch parameterbasierte Kalmanfilterung*", Automatisierungstechnik, 57 (2009) 8, pages 395-402, wherein in this case the inner torque is set equal to a propulsion torque. In the indicating measuring technique, as is well-known, thermodynamic characteristic variables of an internal combustion engine (indicating variables), in particular the inner pressures in the cylinders of the internal combustion engine, are detected and resolved over the crank angle (or equivalently over time) or are averaged over a period or a working cycle or other mechanisms. Then, through the indicating variables, by means of known methods, the inner thermodynamically indicated torque of the internal combustion engine may be calculated. This happens if necessary also resolving in synchronism with the crank angle, or over a working cycle (in case of a 4-stroke engine, for example, two rotations) or by averaging or other processing through other filtering or mechanisms. These indicating variables are partially known also to the engine control unit of internal combustion engine, or are determined in the engine control unit and may then also be read from the engine control unit, and be provided in this way, optionally in real time, if possible.

In the case of an electric motor, the inner torque is the electrically indicated torque, which is active between the rotor and stator, the so-called air gap torque. This air gap torque may for example, as already known, be calculated from a measurement of current and voltage of the electric motor. The air gap torque may, however, also be measured directly by specific commercially available indicating measuring techniques. In the same way, the air gap torque may also be read, as an inner torque of the electric motor, from an electromotor control unit.

For a test run, normally and conventionally a measurable shaft torque on a shaft output of a real component is also used. This shaft torque may be detected on the test bench by means of suitable measuring sensors in a known way, or it may be estimated from the electric torque of the dynamometers and/or a known pendulum support mounted on the test bench. Beyond the torque, on the test bench normally also the rotational angle is measured.

For a test run, in particular for the stimulation of the virtual components of the test object, the propulsion torque is however frequently of interest. This is the torque which the torque generator may effectively provide for driving a load and for changing the status (acceleration, braking) of the mass inertias present.

However, besides the inner torque and the shaft torque, further torques, such as for example torques generated by certain secondary arrangements (such as a cool water pump, a conditioning compressor, an oil pump, starter engine/generator, etc.), friction torques, or losses caused by oscillations of the internal combustion engine act on the mass inertias of the real component of the test object (such as for instance the crank shaft of an internal combustion engine or an engine shaft of an electric motor). The shaft torque which can be detected on the test bench therefore normally does not correspond to the propulsion torque of the torque generator of interest. Such further torques are also not easily, if at all, detectable, so that often from the measured shaft torque a high-quality propulsion torque cannot be deduced by calculation, which may be used for simulation of virtual components of the test object.

This is also due to the fact that for many test object configurations (combination of real and virtual components), the measurement signal for the shaft torque is very noisy, for instance when on the output shaft of the torque generator a rotation damper such as a double mass flywheel is actually arranged or coupling plays are present. In the same way, the measurement signal for the shaft torque is frequently not sufficiently resolved, temporally and/or in the measurement range. Apart from this, the shaft torque is not detected by measurement in all test bench configurations, so that the shaft torque is also not always available. In this case the torque of the dynamometer or of a bending beam may be available and used, wherein such a torque can only approximate the shaft torque.

Similar problems may arise for the measurement signal of the rotation angle, the angular velocity and the angular acceleration, which also may not be sufficiently resolved in time or measurement range.

Moreover, on the test bench the problem often arises that the auxiliary devices aren't actually present, wholly or in part. Therefore, the torques detected on the bench (shaft torques, indicating torques, etc.) would also not be the propulsion torque of interest, which, for example, would be used for a simulation of the internal combustion engine as a part of a virtual vehicle in a vehicle simulation environment.

Based on the previous explanations, it can also be seen that also the measurable torques, whether thermodynamic and/or electric, the sum of which is indicated as the "inner torque," cannot be used as a propulsion torque. Moreover, on the test bench all cylinders are not always actually present (for instance in case of a one-cylinder test engine) or not all cylinders are indicated with an indicating measuring technique in order to detect indicating variables.

SUMMARY

The object of the present invention is therefore to provide a method and a device, with which, even with the partially low-quality measurement variables available on the test bench, it is possible to easily provide a high-quality propulsion torque of a torque generator.

This object is achieved by the fact that the inner torque of the torque generators is measured and based on this measured inner torque from an equation of motion with the measured inner torque, a dynamic torque and a shaft torque measured on the output shaft of the torque generator, a correction torque is estimated, and from the estimated correction torque and from the measured inner torque the propulsion torque is computed. With the measurement of the inner torque of the torque generator, a high-quality measurement variable is obtained, which allows, in an intermediate step, from the low-quality measurement variables of the shaft torque (and/or optionally from the torque of the pendulum support and/or the electric torque of the dynamometers) and/or a rotation angle, to estimate a correction torque and, in a second step, to calculate the searched propulsion torque. Through the estimation it is possible to reduce the influence of the low-quality measurement variables and to obtain a good estimate of the correction torque, since the correction torque either does not depend on time, or only does so in a very slow way, or because a model of the correction torque is built online and is continually corrected. This leads to a qualitatively good propulsion torque, which may be used in further components, in particular in test runs or virtual components. The term "qualitatively good" means in particular that the calculated propulsion torque is provided with a sufficient resolution both in time (angularly) and value and is not overlaid by disturbing signals (such as a measurement noise).

However, this procedure, through the correction torque, also allows the consideration of influences on the torque generator, the sources of which are not actually present on the test bench. It is possible to consider auxiliary devices, for example, which act, as a torque, on the mass inertia of the torque generator, which however are not present on the test bench. In the same way it is also possible to consider typical losses in the torque generator, such as for example losses due to friction. This makes it also possible to consider the torque generator mounted on the test bench with other friction losses (for instance through another lubricant) with respect to those effectively present.

If the equation of motion is averaged for example over a determined period of time and the average value is used as an estimated correction torque, even disturbances of the measurement signals of the shaft torque and/or of the rotation angle are averaged out and their influence on the estimate of the correction torque is greatly reduced.

In order to also model a dependence of the correction torque from the angular velocity, it is advantageously possible to form a correction torque from a base correction torque and at least one term depending on the angular velocity, wherein the base correction torque and the parameter are formed by at least a double averaging of the equation of motion. The precision of the estimate of the correction torque can therefore be increased.

It is also advantageous if a model of the correction torque is generated, in that a characteristic map of the correction torque is generated over the angular velocity, for example. This model may be continuously corrected by current measurements (or trained). With such a model, the searched propulsion torque may be determined in the following in a simple and fast way, even without the necessity of a real-time estimate of the correction torque.

In a further advantageous embodiment, the correction torque may be estimated by a state observer. The state observer allows the easy weighting of certain influences on the estimate and even considering boundary conditions and movement integrals.

To this end, it is advantageously possible to provide the equation of motion with an estimated rotation angle, or its temporal derivates, and to write the estimated correction torque and to set a target function, from which the estimated correction torque may be determined from an optimization of the target function. This provides very good estimates of the correction torque. This method is simple, if from the equation of motion with an estimate value for the correction torque an estimate value of the rotation angle is iteratively calculated, and therefore through optimization of the target function a new estimate value for the correction torque is calculated, wherein at the beginning an initial value of the correction torque is defined, and the iteration is executed as long as a defined interruption criteria is achieved.

In order to consider also the quality of the basic measurement variables in the estimate of the correction torque, the target function may contain weighing factors, which are calculated by means of a Kalman filter. The quality of the estimate may therefore be further improved.

From the correction torques determined on the basis of the condition or state observer, it is also possible to train a mathematical model for the correction torque, for instance a neuronal network, which, on the basis of the current estimates of the correction torques, may also be corrected. With such a model the searched propulsion torque may be determined in the following in a simple and fast way, even without the requirement of an estimate of the correction torque.

The method according to the invention is used, in a particularly advantageous way in a test run for a test object on a test bench, wherein the test object comprises the torque generator as a real component and at least one simulated virtual component, wherein the virtual component of the test object complements the real component of the test object and the simulation of the virtual component processes the calculated propulsion torque. In this way, the simulation in the test run can be provided with high-quality variables of the propulsion torque, but also of the correction torque, whereby also more precise simulations are enabled. This also allows the interface to the following simulation unit to remain the same irrespective of which partial components of the torque generator in the individual case are real or virtual.

If the torque generator comprises, for example, an n-cylinder internal combustion engine, it may be, for example, that the propulsion torque of the n-cylinder engine is calculated from the inner torque, measured in the at least one cylinder of the internal combustion engine. The following simulation unit always sees the n-cylinder internal combustion engine, although on the test bench no such internal combustion engine is mounted.

Said object is also obtained by the above-mentioned device according to the invention in that on the test bench an indicating measurement system is arranged which is provided for measuring an inner torque of the torque generator and that a correction torque calculation unit and a propulsion torque calculation unit are provided, wherein the correction torque calculation unit is provided for estimating, on the basis of the measured inner torque, from an equation of motion with the measured inner torque, a dynamic torque and a shaft torque measured on the drive shaft of the torque generator, a correction torque and the propulsion torque calculation unit is provided for calculating, from the estimated correction torque and the measured inner torque, the propulsion torque according to the relation $M_v = \hat{M}_{cor} + M_i$. $M_v$ indicates the propulsion torque, $M_{cor}$ indicates the estimated correction torque and $M_i$ indicates the measured inner torque.

In a variant of the invention, the torque generator comprises an n-cylinder internal combustion engine and on the test bench on at least one cylinder an indicating measurement system is positioned.

In a further variant, the torque generator comprises an n-cylinder internal combustion engine and on the test bench at least one cylinder of the n-cylinder internal combustion engine is mounted.

BRIEF DESCRIPTION OF THE DRAWINGS

The present invention is explained in the following with reference to FIGS. 1 to 2, which show, as an example, schematically and in a non-limiting way, advantageous embodiments of the invention. In particular

DETAILED DESCRIPTION

Figure 1:
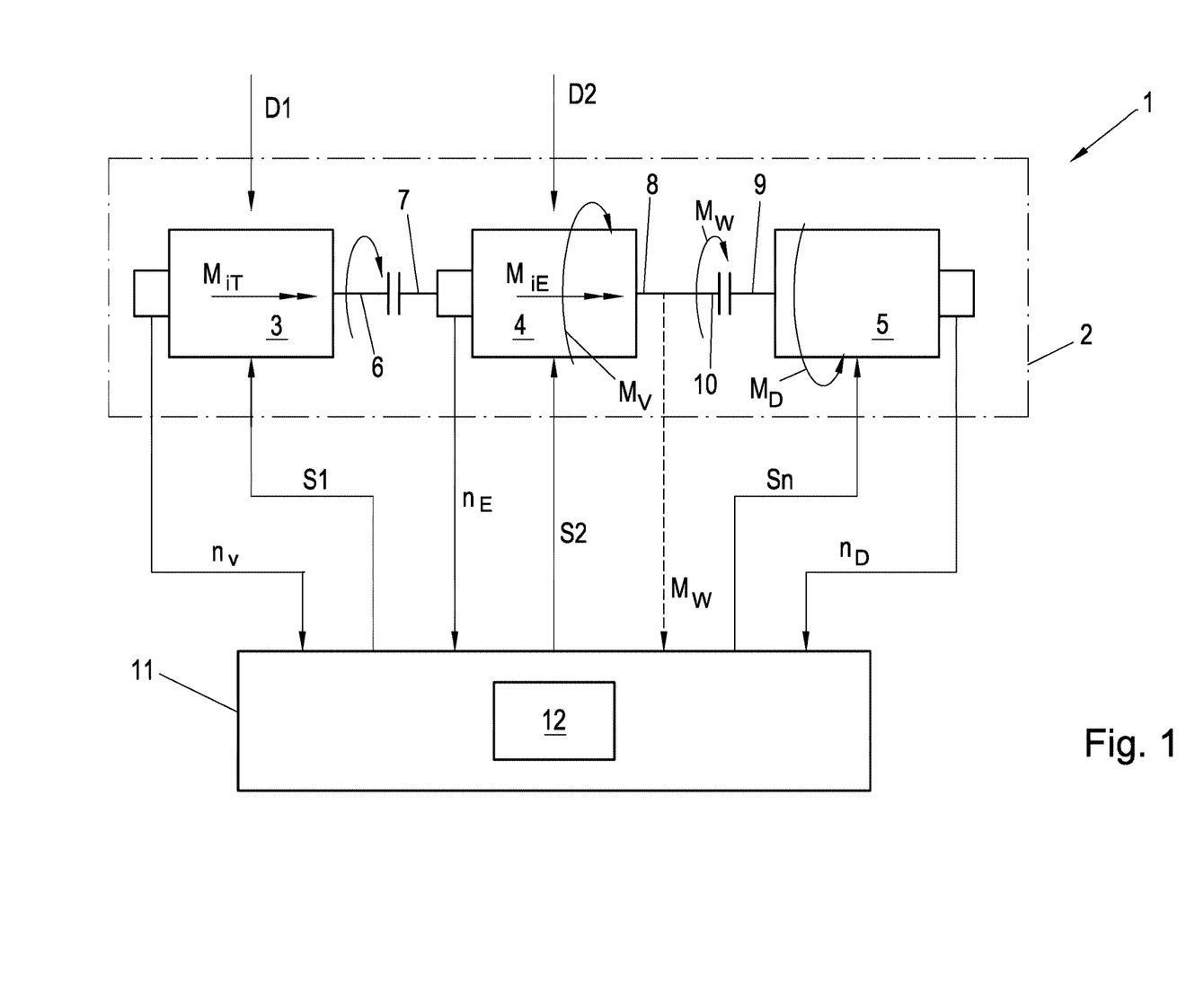
FIG. 1 is a typical test object configuration on a test bench and FIG. 2 is an assembly according to the invention for determining the propulsion torque.

In FIG. 1 an exemplary test bench configuration 1 on a test bench 2 is shown. On the test bench 2 as the real component of the test object a hybrid transmission with a real internal combustion engine 3 and a real electric motor 4 is mounted. "Real" in this case means that these real components are physically present hardware. The internal combustion engine 3 and the electric motor 4 are mechanically connected to each other by a connection shaft 6 with a clutch 7. On the output shaft 8 of the hybrid transmission acts the shaft torque $M_2$. The output shaft 8 receives from the torque generator D a propulsion torque $M_v$. A load machine 5 (dynamometer) is mechanically connected with the output shaft 8 via a dynamometer shaft 9 and a clutch 10. The load machine 5 generates, according to the setting of the test run to be executed, a load torque $M_D$, which influences also the shaft torque $M_w$.

In a test bench control unit 11 the test run to be executed is implemented. To this end, in the test bench control unit 11, a simulation model 12 (which may also be comprised of various individual interacting partial models) is implemented, which simulates virtual components of the test object. Virtual components may in this case be, for example, a gearbox, a differential gear, a clutch, the mass inertias of the virtual internal combustion engine, a battery, tires, the vehicle, the environment of the vehicle, the interaction of the vehicle with the environment, etc. The combination of real and virtual components adds up to the test object. Depending on the test run, it is obvious that any test object configurations (real and virtual components) and test bench configurations may be used. For example, in the case of a real four-wheel-drive transmission, four load machines 5, each for a respective side shaft of the transmission, may be provided. However, the invention does not deal with concrete configurations of the test object and of the test bench configuration.

The test bench control unit 11 also determines, according to the predetermined test run, the control variables Sn for the test bench components and for the test object, with which in particular also the real components of the test object configuration and the load machine 5 are controlled on the test bench 2, as shown in FIG. 1. The test bench control unit 11 may also capture different measurement variables from the test bench or from the real components of the test object, such as for example the speed $n_v$ of the internal combustion engine 3, of the electric motor 4 $n_E$ and of the load machine 5 $n_D$, a rotation angle φ as well as the active shaft torque $M_w$ on the output shaft 8, if a suitable torque sensor is mounted, or alternatively also the load torque $M_D$ or a torque determined by a pendulum support.

In order to determine the propulsion torque $M_v$ of interest, it is not possible to assume a high quality detected shaft torque $M_w$, since such a high-quality measurement value is normally absent, as noted earlier. Completely to the contrary, it has to be assumed that the shaft torque $M_w$ and/or the rotation angle $\varphi$ is present as a low-quality measurement signal, i.e. with a low temporal or value resolution and/or noisy signal. Therefore, according to the invention, the inner torque Mi of the torque generator D (indicated in FIG. 1) is used. This is explained with reference to FIG. 2.

Figure 2:
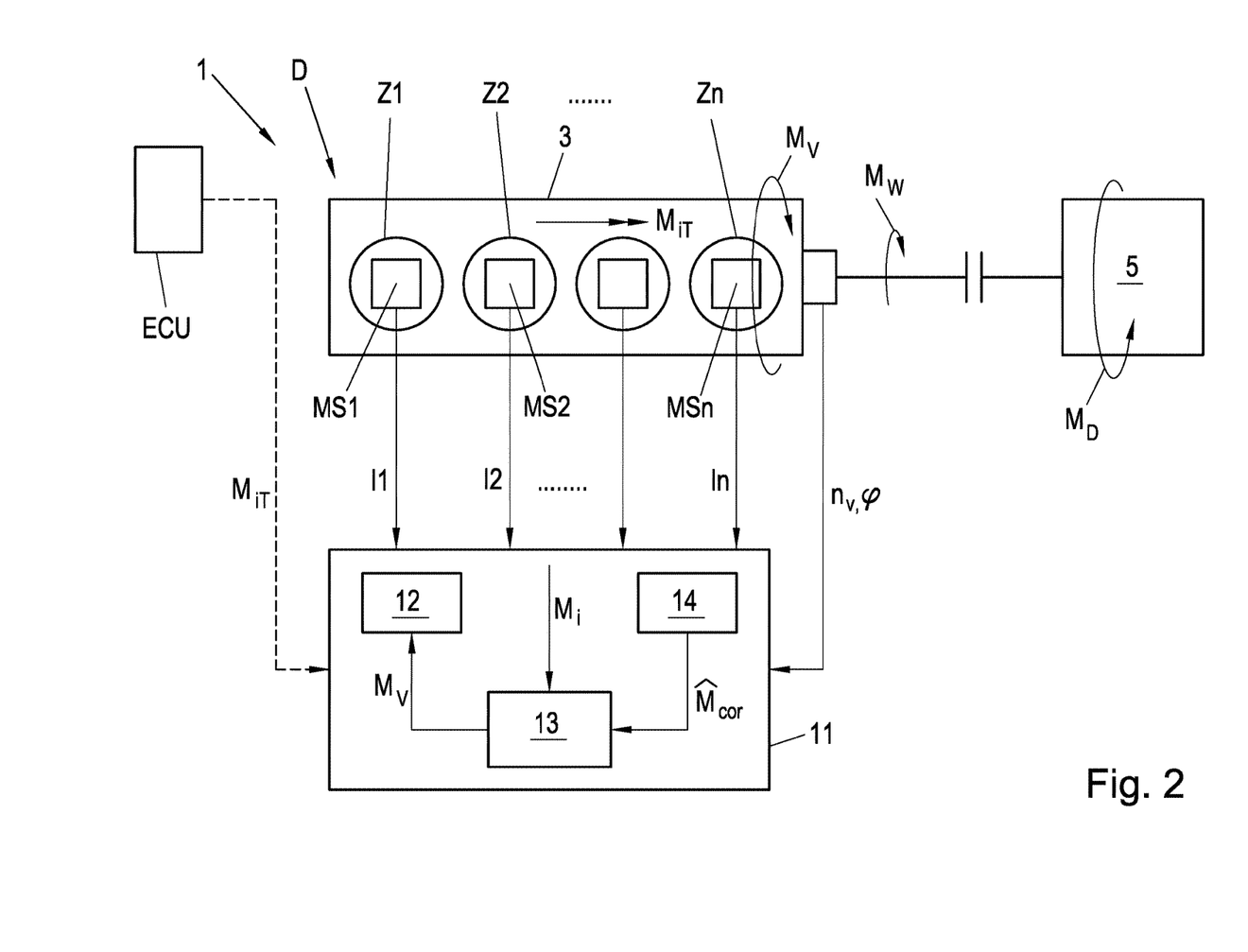

In FIG. 2, an n-cylinder internal combustion engine 3 as a torque generator D1 is arranged on the test bench 1. The internal combustion engine 3 in this example is a four-cylinder engine. On each cylinder Z1 . . . Zn an indicating measurement system MS1 . . . MSn is arranged. An indicating measurement system MS is known to detect thermodynamic variables of the combustion in the cylinders Z1 . . . Zn, as in particular the change of inner pressure over time or equivalently the change of inner pressure depending on crank angle, from which the inner torque $M_{iT}$ of internal combustion engine 3 is obtained as a sum torque. The detected indicating measurement variables I1 . . . In are transmitted to the test bench control unit 11. An indicating variable I1 . . . In may already represent the inner torque $M_{iT}$ of the internal combustion engine 3. Alternatively, the inner torque $M_{iT}$ may also be computed from the indicating variables I1 . . . In in the test bench control unit 11. In a further alternative, the inner torque $M_{iT}$ of the internal combustion engine 3 may also be provided by an engine control apparatus ECU to the test bench control unit 11, as shown in FIG. 2, if this can be performed with sufficient speed and precision.

In case of an electric motor 4 as a torque generator D2, the indicating variables I1 . . . In may for example comprise the electric motor current and the electric motor voltage, which are detected by the indicating measurement system MS and which may then be converted into an inner torque $M_E$ of the electric motor 4 (air gap torque).

If various interconnected torque generators D1, D2 are present, as shown for example in FIG. 1, the individual inner torques $M_{iT}$, $M_{iE}$ of individual torque generators D1, D2 add with a correct sign in order to form the inner torque $M_i$. The inner torque $M_i$ of torque generator D is therefore generally obtained as $$M_i = \sum_{D_j} M_{iD_j}$$

with $j \in \Box_r$. In the test bench control unit 11, the sum of all indexed torques of individual torque generators D1, D2 is known in real time as inner torque Mi of torque generator D on test bench 2. Therefore, in the following a generalized torque generator D is mentioned, which may be comprised of a plurality of individual torque generators D1, D2.

On the mass inertia of the torque generator D further torques are also acting, which influence the propulsion torque $M_v$ provided by the torque generator D based on inner torque $M_i$ and which are summed to a correction torque $M_{cor}$. These further torques typically cause a reduction of the propulsion torque $M_v$ of torque generator D. Typical is a friction torque $M_{fric}$, which detects, for example, the friction effects in the internal combustion engine 3 or in the electric motor 4. The correction torque $M_{cor}$ may also be comprised of further torques, which act on the mass inertia of the torque generator D. For example, torques $M_{auxm}$ caused by a number m of secondary assemblies connected to the crank shaft or engine shaft may be considered. Such secondary assemblies may for example be a water pump, an oil pump, a conditioner compressor, a starter-engine/generator, etc. The correction torque $M_{cor}$ would then be obtained as follows:

$$M_{cor} = M_{fric} + \sum_n M_{auxn},$$

wherein torques are obviously algebraically introduced (and therefore with their proper sign). In order to consider the correction torque Maw in determining the propulsion torque $M_v$, in the test bench control unit 11 a correction torque computing unit 14 is provided, in which the correction torque $M_{cor}$ is computed.

For the propulsion torque $M_v$ of the generalized torque generator D, due to a simplified definition equation, it must hold that $M_v = M_i + M_{cor}$, wherein the torques are algebraic variables and therefore have to be provided with their correct sign.

In the same way, the Euler equation of motion in the form $M_{dyn} = M_v + M_w$ (torque equilibrium) has to be considered. The dynamic torque $M_{dyn}$ is obtained in the simplest case notoriously from $J\ddot{\varphi}$, where J is the mass moment of inertia acting on the crank shaft of the internal combustion engine 3 or on the shaft of the electric motor 4 and $\ddot{\varphi}$ is the angular acceleration. The mass moment of inertia J may also be dependent on the rotation angle $\varphi$, as typical for a crank shaft, and therefore $J(\varphi)$. In the same way, the dynamic torque $M_{dyn}$ may consider not only the generalized angular acceleration $\ddot{\varphi}$ but other additional dynamic torques, in particular a centrifugal torque in the form of $$\frac{1}{2}\frac{dJ(\varphi)}{d\varphi}\dot{\varphi}^2,$$

which is typical for an internal combustion engine 3, since the mass moment of inertia J varies along a rotation of the crank shaft. The dynamic torque $M_{dyn}$ may then follow as $$M_{dyn} = J(\varphi)\ddot{\varphi} + \frac{1}{2}\frac{dJ(\varphi)}{d\varphi}\dot{\varphi}^2.$$

In the same way, the dynamic torque $M_{dyn}$ could for example also consider the fact that a mass moment of inertia varies, when a clutch 7 between internal combustion engine 3 and electric motor 4 is opened or closed. The equation of motion follows then as $$J(\varphi)\ddot{\varphi} + \left[\frac{1}{2}\frac{dJ(\varphi)}{d\varphi}\dot{\varphi}^2\right] = \underbrace{M_i + M_{cor}}_{M_v} + M_w.$$

In square brackets the optional term of centrifugal torque is provided as mentioned above.

The rotation angle $\varphi$, the angular velocity $\dot{\varphi}$, or the angular acceleration $\ddot{\varphi}$ may be measured or may be derived from the detected speed $n_{(V,E)}$.

From this, the requested propulsion torque $M_v$ may be derived by measuring the shaft torque $M_w$, directly from the equation of motion. The problem, however, is the normally very low quality of the measured value of shaft torque $M_w$, which is frequently noisy and has a low temporal and value resolution. Moreover, also the angular acceleration $\ddot{\varphi}$ is extremely noisy, since it is not directly measured, but is obtained from the angular velocity $\dot{\varphi}$ by time differentiation, or from the rotation angle $\varphi$ through double time differentiation. The directly obtained propulsion torque $M_v$ would therefore also be almost useless, for example for use in a simulation, or it should be correspondingly processed (for example by filtering), which however causes a loss of information.

In order to circumvent this problem, according to the invention another path is followed, in that from the inner torque Mi, which is known, is of high quality and often has a high frequency resolution and is also almost free of dead time, and from the noisy shaft torque $M_w$ and the noisy acceleration signal 0, a high-quality estimate of the correction torque $M_{cor}$ is first determined. From the above definition of propulsion torque $M_v$=Mi+$M_{cor}$ a high-quality (i.e. non-noisy and high-frequency) propulsion torque $M_v$ is then determined. In the test bench control unit 11 a propulsion torque computing unit 13 is provided to this end, which computes the relevant propulsion torque $M_v$ and provides it to other components of the test bench 1, in particular to the simulation by means of simulation model 12 of virtual components of the test object. The inner torque $M_i$ which is directly computed from measurements, provides an additional measurement variable, which allows the determination of both variables, i.e. the correction torque $M_{cor}$ and the propulsion torque $M_v$.

Obviously, the correction torque computing unit 14 and the propulsion torque computing unit 13 may be provided as independent hardware, may be integrated in a single hardware, or may also be provided as software modules in the test bench control unit 11.

The determination of the correction torque $M_{cor}$ is based, according to the invention, on an estimate based on the high-quality inner torque $M_i$ and low-quality measurement values for shaft torque $M_w$ and/or rotation angle $\varphi$. The estimate may be provided in different ways, as shown in an example in the following by means of advantageous embodiments.

From the above equation of motion the correction torque $M_{cor}$ may be computed from the relation $M_{cor}=M_{dyn}-M_i-M_w$. In this case the circumstance that the correction torque $M_{cor}$ normally varies very slowly over time is exploited. The correction torque $M_{cor}$ may therefore be considered in certain periods as a quasi-static variable, so that $M_{cor}$ $\overline{M}_{cor}$=const., with an average correction torque $\overline{M}_{cor}$ as an estimate $\hat{M}_{cor}$ of the correction torque. For example, a friction torque $M_{fric}$ depends on parameters like temperature, air humidity, age, etc., however these parameters vary only very slowly in time. Secondary assemblies also normally cause a torque $M_{auxm}$, which is time-independent. This allows to estimate the correction torque $M_{cor}$ in that it is averaged over a relatively long period of time (relative to the desired real-time computing). Due to this temporal averaging, irregularities in the shaft torque $M_w$ and dynamic torque $M_{dyn}$ (for instance due to a noisy measurement of angle of rotation $\varphi$) are also averaged out and the influence of such irregularities is reduced. If for example the averaging is done over a working cycle of a four-cylinder internal combustion engine, $$\int_{\varphi=0}^{4\pi}\left(J(\varphi)\ddot{\varphi}+\left[0.5\frac{\delta J(\varphi)}{\delta\varphi}\dot{\varphi}^2\right]\right)d\varphi - \int_{\varphi=0}^{4\pi}(M_i+M_w)d\varphi = 4\pi\overline{M}_{cor}$$

follows from the equation of motion, from which the correction torque $\hat{M}_{cor}$ may be estimated as an average correction torque $\overline{M}_{cor}$. In the square brackets the optional term of centrifugal torque is provided as mentioned above. It is hereby sufficient to estimate the average correction torque $\overline{M}_{cor}$ once, for example, and then retain the same for the following cycle, or a plurality of following cycles. Alternatively, for the average correction torque $\overline{M}_{cor}$, a model for different angular velocities may be construed, which is continuously estimated and corrected. In the same way, the average correction torque $\overline{M}_{cor}$ may also be computed continuously, in the form of a shifting average value. Instead of a working cycle the averaging may also be provided over any other period (time or angle).

The integral $$\int_{\varphi=0}^{4\pi}M_i d\varphi$$

may be set equal to the variable indicated as Indicated Mean Effective Pressure (IMEP) in the indicating measurement technique, which is a variable which is normally directly provided by the indicating measurement or which is provided in an engine control ECU.

The model of the correction torque $M_{cor}$ normally does not depend on time, or depends on it only in a very slowly way. The correction torque $M_{cor}$ may, however, depend on the angular velocity $\dot{\varphi}$, in the form $M_{cor}(\dot{\varphi})$. Also in this case the correction torque $M_{cor}$ may be easily estimated from the equation of motion, if for example the estimated correction torque $\hat{M}_{cor}(\dot{\varphi})$ is written as the sum of a basic correction torque $M_{cor,0}$ and a term $\kappa\dot{\varphi}$ dependent from the angular velocity $\dot{\varphi}$, so that $\hat{M}_{cor}(\dot{\varphi})=M_{cor,0}+\kappa\dot{\varphi}$. The term $M_{cor,0}$ and parameter $\kappa$ vary only very slowly over time. From the equation of motion it follows then again $$\int_{\varphi=0}^{\theta}\left(J(\varphi)\ddot{\varphi}+\left[0.5\frac{\delta J(\varphi)}{\delta\varphi}\dot{\varphi}^2\right]\right)d\varphi - \int_{\varphi=0}^{\theta}(M_i+M_w)d\varphi = \int_{\varphi=0}^{\theta}(M_{cor,0}+\kappa\dot{\varphi})d\varphi,$$

from which both variables $M_{cor,0}$ and parameter $\kappa$ may be computed. To this end, either the integration limit $\theta$ or the angular velocity $\dot{\varphi}$ may be varied, wherein at least two variations are necessary in order to compute both variables.

It is readily apparent that with above-mentioned averaging of the equations of motion it is also possible to estimate a characteristic map (model) for the correction torque $\hat{M}_{cor}$ depending on the angular velocity $\dot{\varphi}$, which may then be used for computing the propulsion torque $M_v$.

In this way, obviously, other dependencies of the correction torque $M_{cor}$ may be considered, in that the estimated correction torque $\hat{M}_{cor}$ is completed with further or other terms. Instead of the above linear relation $M_{cor,0}+\kappa\dot{\varphi}$ it is for example possible to determine online, a more complex, in particular non-linear, model for the correction torque $M_{cor}$ as a function of the crank angle $\varphi$ and/or the angular velocity $\dot{\varphi}$ or even the angular acceleration $\ddot{\varphi}$, which may also be continuously corrected online.

Obviously, from known variables $M_{dyn}$, $M_i$, $M_w$, a mathematical model for estimating the correction torque $\hat{M}_{cor}$ as a function of crank angle $\varphi$ and/or angular velocity $\dot{\varphi}$ or speed n may be trained, for example in the form of a neuronal network. The parameters of a physical model of the estimated correction torque $\hat{M}_{cor}$ could also be determined as a function of measured variables, for example with known methods of parameter estimation.

An estimated value of the correction torque $\hat{M}_{cor}$ may also be estimated from the known inner torque $M_i$, according to the invention, by means of a state observer. The general procedure is again based on above mentioned equation of motion of form $$J(\varphi)\ddot{\varphi} + \left[\frac{1}{2}\frac{\delta J(\varphi)}{\delta \varphi}\dot{\varphi}^2\right] = \underbrace{M_i + M_{cor}}_{M_v} + M_w.$$

If estimated values are indicated by "^", the equation of motion may be written in the following form.

$$J(\hat{\varphi})\ddot{\hat{\varphi}} + \left[\frac{1}{2}\frac{\delta J(\varphi)}{\delta \varphi}\dot{\hat{\varphi}}^2\right] = M_i(t) + \hat{M}_{cor}(t) + M_w(t)$$

For that, an arbitrary target function Z is defined as a function of an estimated rotation angle $\hat{\varphi}$, or its temporal derivatives $\dot{\hat{\varphi}}$ and $\ddot{\hat{\varphi}}$, and of the estimated correction torque $\hat{M}_{cor}$, which is minimized, Z→min.

As a target function Z, an integral in the form $$\int_{t=0}^{T_{max}} \left\{\lambda_\varphi(\varphi_m(t) - \hat{\varphi}(t))^2 + \lambda_M \hat{M}_{cor}^2(t)\right\} dt = \min \text{ or an integral in the form}$$

$$\int_{t=0}^{T_{max}} \left\{\lambda_\varphi(\varphi_m(t) - \hat{\varphi}(t))^2 + \lambda_{\dot{\varphi}}(\dot{\varphi}_m(t) - \dot{\hat{\varphi}}(t))^2 + \lambda_M \hat{M}_{cor}^2(t)\right\} dt = \min$$

is used, wherein "m" indicates measured variables and with weighting factors $\lambda_\varphi$, $\lambda_{\dot{\varphi}}$, $\lambda_M$.

The weighing factors $\lambda_\varphi$, $\lambda_{\dot{\varphi}}$, $\lambda_M$ are manually defined or may be defined by known mathematical methods. The determination of weighing factors $\lambda_\varphi$, $\lambda_{\dot{\varphi}}$, $\lambda_M$ by means of already known Kalman filtering is mentioned, for example, as described for instance in the document by S. Jakubek, et al., "Schätzung des inneren Drehmoments von Verbrennungsmotoren durch parameterbasierte Kalmanfilterung", Automatisierungstechnik, 57 (2009) 8, pages 395-402. The Kalman filtering has the advantage, in this case, that with it the quality of the measured values is considered in determining the weighing factors $\lambda_\varphi$, $\lambda_{\dot{\varphi}}$, $\lambda_M$, which is very advantageous in the application according to the invention, in which very noisy or not well-resolved measured values may be present.

It is expressively to be noted that the above-mentioned target function is only an example, and that also any other target function Z could be equally used. In particular in the target function Z, temporal derivatives of the correction torque $\hat{M}_{cor}$ could also be contained.

The searched estimate value for the correction torque $\hat{M}_{cor}$ is then determined by minimization (optimization) of target function Z. To this end a variety of methods are known, which cannot all be mentioned in this document. An example is an analytical solution of the optimization problem, which may be derived for instance when using linear target functions Z (Ricatti-equation). Also iterative methods may be used, as described in the following.

To this end, at the beginning an initial value for correction torque $\hat{M}_{cor}$ is provided. From the equation of motion in each iteration step the estimated rotation angle $\hat{\varphi}$, or its temporal derivatives $\dot{\hat{\varphi}}$ and $\ddot{\hat{\varphi}}$ are calculated. This may happen algebraically. With the estimated rotation angle $\hat{\varphi}$, or its temporal derivatives $\dot{\hat{\varphi}}$ and $\ddot{\hat{\varphi}}$, from the optimization of the target function Z(t), a new estimated value for the correction torque $\hat{M}_{cor}$ is computed and the above-mentioned steps are repeated, until a predetermined stop criterion for optimization is fulfilled. The estimation of the correction torque $\hat{M}_{cor}$ may be performed online in a continuous way during a test run.

It is also possible that with the estimate of the correction torque $\hat{M}_{cor}$ a model for the correction torque $\hat{M}_{cor}$ is trained, for example in the form of a neuronal network. With such a model, then, depending on determined variables, such as for example an angular velocity $\dot{\varphi}$, the correction torque $\hat{M}_{cor}$ for a test run may be determined. The model may obviously be updated continually with update measurement values and the above-mentioned method.

In this context it is also known that in the optimization boundary conditions for the variables of the target function may be defined, which are considered in the optimization.

Then, with the estimated value of the correction torque $\hat{M}_{cor}$, which is determined with the above-mentioned method and is therefore known, from the above equilibrium equation, the propulsion torque $M_v$ of the torque generator D may be determined in the form $M_v = \hat{M}_{cor} + M_i$.

This allows to provide the propulsion torque $M_v$ for a test run, but also for other applications, in particular for simulations in a simulation model 12. This calculation takes place for the test run in predetermined periods of time, for instance every millisecond or every 1 degree of rotation angle $\varphi$, i.e. in real time. Therefore, the propulsion torque $M_v$ is available in each desired time step, for example in order to be processed in a simulation model 12 for a virtual component of the test object.

Besides the propulsion torque $M_v$, the measured shaft torque $M_w$ may also be rendered plausible. From the knowledge of the propulsion torque $M_v$ and of the dynamic torque $M_{dyn}$, from the above equation of motion, an estimated/computed shaft torque $\hat{M}_w$ may be determined. In this way, the measurement of the shaft torque $M_w$ may be rendered plausible, for instance in order to identify a shaft rupture on the test bench 2. It is also possible to correct the measured shaft torque (noisy and/or imprecise) $M_w$ or it may be replaced with the computed estimated shaft torque $\hat{M}_w$. For a simulation in a simulation model 12 or for other components of the test bench 2, it is therefore possible to provide a better-quality shaft torque $M_w$.

Due to the knowledge of a correction torque $M_{cor}$, in fact an estimated value for the correction torque $\hat{M}_{cor}$, it is possible to study different influences on the propulsion torque $M_v$ on the test bench 2. In particular, it is possible to analyze the influence of different torques considered in the correction torque $M_{cor}$.

As an example, a certain test run is assumed in which an internal combustion engine 3 is operated on the basis of settings of the test run and wherein the exhaust gas emissions are measured. It would now be possible to analyze how the gas emissions vary, when another conditioner compressor (which is simulated as the virtual component of the test object) or when a different lubrication oil (for example through correction factors in the determination of the correction torque $M_{cor}$) is used. These analyses may be executed without the respective components (in this case the conditioning compressor or the lubrication oil) having to be present in real. It is sufficient that these components are virtually present, which represents a great simplification in the development of a test object. In particular this is also due to the fact that at the time of first test runs, often not all components which are driven by the torque generator D are actually available.

With the procedure according to the invention, another test scenario is also feasible. If in the simulation model 12 a virtual complete vehicle with a multi-cylinder internal combustion engine is simulated, at the interface between the computing unit 13 and the simulation model 12 the propulsion torque $M_v$ of the multi-cylinder internal combustion engine is expected. If, however, on the test bench 1 only a single cylinder internal combustion engine is mounted, a test run may nonetheless be performed. The missing cylinders are simulated in the computing unit 13. This takes place, in the simplest case, by multiplication of all measurement variables of the actually mounted cylinder with a corresponding factor and if necessary also with a corresponding phase shift and correction of the dynamic torques $M_{dyn}$ (in particular in the case of an internal combustion engine). This is particularly interesting in the development of large engines, for instance ship engines with a high number of cylinders, whereby first test runs are possible even before the large engine is built as a whole.

The simulation of missing cylinders may also be necessary if on the test bench 2 not all cylinders of the internal combustion engine 3 are provided with an indicating measurement system M. In this case the cylinders without the indicating measurement system M would be simulated. The simulation model 12 would therefore always receive the propulsion torque $M_v$ of the expected multi-cylinder engine, possibly with all secondary assemblies.

This has also the inestimable advantage that on the test bench 2, the interfaces, for example for components of the simulation model 12, may be unchanged, regardless of which components of the test object are real or virtual.

Equally, the method according to the invention may be expanded with further degrees of freedom of movement. In this case one would not assume an equation of motion in one degree of freedom of movement, here the rotation angle φ, but a system of equations according to the number of degree of freedom of movement. This is for instance interesting when the torque generator D is modeled with a non-rigid suspension, such as for instance in an internal combustion engine 4 in a vehicle. The active forces or torques cause, due to machine dynamics, also a corresponding movement of the torque generator D with respect to the vehicle. In this way, multidimensional equations of motion would be obtained, which in the sense of the invention are considered as the above-mentioned equation of motion. Nothing is therefore changed in above-mentioned procedure according to the invention.

The invention claimed is:

1. A method for determining a propulsion torque of a torque generator, comprising:
   mounting the torque generator on a test bench,
   outputting, by the torque generator, the propulsion torque onto an output shaft of the torque generator,
   measuring a shaft torque on the output shaft,
   measuring an inner torque of the torque generator using an indicating measurement system,
   transmitting the measured inner torque and shaft torque to a correction torque computing unit,
   estimating a correction torque in the correction torque computing unit, based on the measured inner torque, from an equation of motion, the equation of motion using the measured inner torque, a dynamic torque of the torque generator and the measured shaft torque, and
   computing the propulsion torque in a propulsion torque computing unit, from the estimated correction torque and from the measured inner torque, according to a relation that the propulsion torque is equal to the correction torque plus the measured inner torque.

2. The method according to claim 1, wherein the equation of motion is averaged over a certain time period and the average value is used as an estimated correction torque.

3. The method according to claim 2, wherein the correction torque is composed of a basic correction torque and at least one variable as a function of angular velocity and a parameter,
   wherein the variable and the parameter are determined by at least two averaging operations on the equation of motion.

4. The method according to claim 3, wherein a characteristic map of the correction torque is formed over angular velocity.

5. The method according to claim 2, wherein a characteristic map of the correction torque is formed over angular velocity.

6. The method according to claim 1, wherein from the equation of motion a state observer is provided, which estimates the correction torque.

7. The method according to claim 6, wherein the equation of motion is written with an estimated rotation angle, or a temporal derivative and of the estimated rotation angle, and with the estimated correction torque, and
   a target function is set, wherein the target function comprises the estimated rotation angle, and a measured rotation angle, as well as the estimated correction torque, and wherein the estimated correction torque is determined by optimizing the target function.

8. The method according to claim 7, wherein an estimated value of the rotation angle is computed in an iterative method from the equation of motion with an estimated value for the correction torque, and therefrom by optimizing the target function, a new estimated value for correction torque is computed, wherein at the beginning an initial value of the correction torque is defined and the iteration is continued until a defined stop criterion is met.

9. The method according to claim 8, wherein the target function contains weighting factors.

10. The method according to claim 7, wherein the target function contains weighting factors.

11. The method according to claim 7, wherein with the correction torques determined by the state observer, a mathematical model for the correction torque is trained.

12. The method according to claim 11, wherein the mathematical model is corrected on the basis of current estimates of the correction torque.

13. A method according to claim 1 in a test run for a test object on a test bench, wherein the test object comprises the torque generator as a real component and at least one simulated virtual component, wherein the virtual component of the test object complements the real component of the test object, and the simulation of the virtual component processes the computed propulsion torque.

14. The method according to claim 13, wherein the torque generator comprises an n-cylinder internal combustion engine and the propulsion torque of the n-cylinder internal combustion engine is computed from the inner torque, which is measured on at least one cylinder of the internal combustion engine.

15. The method according to claim 1, wherein the propulsion torque is indicative of a torque the torque generator is capable of providing for driving a load.

16. The method according to claim 1, wherein the propulsion torque is indicative of a torque the torque generator is capable of providing for changing an inertia of a mass.

17. A device for determining the propulsion torque of a torque generator, comprising:
   a torque generator mounted on a test bench, wherein an indicating measurement system is arranged on the test bench, configured to measure an inner torque of the torque generator,
   wherein the torque generator provides an output shaft of the torque generator with a propulsion torque,
   a correction torque computing unit which estimates a correction torque from the measured inner torque, a dynamic torque of the torque generator and a shaft torque measured on an output shaft of the torque generator, and
   a propulsion torque computing unit which computes, from the estimated correction torque and the measured inner torque, the propulsion torque according to the relation the propulsion torque is equal to the correction torque plus the inner torque.

18. The device according to claim 17, wherein the torque generator comprises an n-cylinder internal combustion engine, and on the test bench, on at least one cylinder, an indicating measuring system is arranged.

19. The device according to claim 17, wherein the torque generator comprises an n-cylinder internal combustion engine, and on the test bench, at least one cylinder of the n-cylinder internal combustion engine is mounted.

* * * * *